United States Patent
Taskar et al.

(10) Patent No.: US 9,335,768 B2
(45) Date of Patent: May 10, 2016

(54) CLUSTER MASS FLOW DEVICES AND MULTI-LINE MASS FLOW DEVICES INCORPORATING THE SAME

(71) Applicant: Lam Research Corporation, Fremont, CA (US)

(72) Inventors: Mark Taskar, San Mateo, CA (US); Iqbal Shareef, Fremont, CA (US)

(73) Assignee: LAM RESEARCH CORPORATION, Freemont, CA (US)

( * ) Notice: Subject to any disclaimer, the term of this patent is extended or adjusted under 35 U.S.C. 154(b) by 383 days.

(21) Appl. No.: 14/025,162

(22) Filed: Sep. 12, 2013

(65) Prior Publication Data

US 2015/0068613 A1    Mar. 12, 2015

(51) Int. Cl.
*F16K 27/00* (2006.01)
*G05D 7/06* (2006.01)

(52) U.S. Cl.
CPC ............ *G05D 7/0641* (2013.01); *F16K 27/003* (2013.01); *G05D 7/0652* (2013.01); *Y10T 137/2499* (2015.04)

(58) Field of Classification Search
CPC ... G05D 7/0641; G05D 7/0652; F16K 27/003
USPC ............................. 137/88, 101.19, 487.5, 884
See application file for complete search history.

(56) References Cited

U.S. PATENT DOCUMENTS

| | | | | |
|---|---|---|---|---|
| 4,938,789 | A * | 7/1990 | Tsuchiya et al. | 65/144 |
| 5,992,463 | A * | 11/1999 | Redemann et al. | 137/884 |
| 6,227,227 | B1 * | 5/2001 | Poleshuk et al. | 137/98 |
| 6,766,260 | B2 * | 7/2004 | Ambrosina et al. | 702/45 |
| 7,610,117 | B2 * | 10/2009 | Brodeur et al. | 700/281 |
| 7,673,645 | B2 * | 3/2010 | Ding et al. | 137/9 |
| 2002/0179148 | A1 * | 12/2002 | Lull et al. | 137/487.5 |
| 2004/0089837 | A1 * | 5/2004 | Bauer et al. | 251/367 |
| 2006/0037644 | A1 * | 2/2006 | Nishikawa et al. | 137/487.5 |
| 2006/0096533 | A1 * | 5/2006 | Mochizuki et al. | 118/715 |
| 2006/0272721 | A1 * | 12/2006 | Milburn | 137/884 |
| 2007/0295405 | A1 * | 12/2007 | Okabe et al. | 137/240 |
| 2010/0108154 | A1 * | 5/2010 | Minami et al. | 137/88 |

* cited by examiner

Primary Examiner — Kevin Murphy (57) ABSTRACT

A multi-line mass flow device configured for controlled delivery of two or more fluids into a process chamber. The multi-line mass flow device comprises a cluster mass flow control manifold and a multi-inlet manifold. The cluster mass flow control manifold comprises a controller, a gas manifold mounting block, and two or more gas flow control stations. The multi-inlet manifold comprises a multi-inlet mounting block, and two or more isolation valves mounted on the multi-inlet mounting block.

20 Claims, 7 Drawing Sheets

CLUSTER MASS FLOW DEVICES AND MULTI-LINE MASS FLOW DEVICES INCORPORATING THE SAME

BACKGROUND

This disclosure is directed to mass flow devices and, more particularly, mass flow devices that can be configured for controlled delivery of two or more fluids into a process chamber.

SUMMARY

In etch or thin film processes, several hazardous and/or non-hazardous gases may be used. Care must be taken in delivering these gases to the processing chamber. For example, a gas panel may be used to provide a gas or a mixture of gases into a reaction chamber. Often, a gas panel is used to mix, pre-mix, purge, sample and vent the gases, and may include multiple inlet gas lines, with each inlet gas line being controlled by gas sticks made up of valves, regulators, pressure transducers, mass flow controllers and other components. Due to the number of gas lines involved and the number of components used to control the flow for each gas line, the gas lines are typically spaced far apart from each other. The present inventors have recognized that this can cause compatibility issues when switching between different gases that are to be delivered to the processing chamber. In addition, the distance between each gas line can also affect the accuracy in quickly mixing together gases from different lines, particularly, where gases from closer gas lines reach the mixing point within the gas panel sooner than gases from further gas lines. Accordingly, it may be desirable to provide an improved device for delivering two or more gases into a process chamber.

In some embodiments, a cluster mass flow device is provided comprising a controller, a gas manifold, two or more control valves, and two or more flow sensors. The controller is electrically coupled to each control valve and to each flow sensor. The gas manifold comprises two or more gas distribution flow paths, a gas mixing region, and a gas outlet. Each gas distribution flow path of the gas manifold comprises a gas inlet configured to receive a gas, and a gas flow channel coupled to the gas inlet. The gas mixing region of the gas manifold is fluidly coupled to each gas flow channel. The gas outlet of the gas manifold is fluidly coupled to the gas mixing region. Each flow sensor and each control valve are fluidly coupled to a corresponding gas flow channel of the gas distribution flow path, and each flow sensor is positioned between the control valve and the gas mixing region, and downstream of the control valve. The controller is programmed to provide a control signal to each control valve for controlling a position of each control valve such that a desired gas flow is produced. The controller is further programmed to utilize a gas flow recipe program to automatically receive and process measured gas flow signals indicative of a flow rate of a gas flowing through each gas flow channel from each flow sensor and adjust a position of each control valve to regulate gas flow based on the measured gas flow signals in order to maintain a desired mass of gas flow for two or more gases to be released from the gas outlet.

In other embodiments, a cluster mass flow device is provided comprising a controller, a gas manifold mounting block, and two or more gas flow control stations. An exterior of the gas manifold mounting block comprises an inlet end, an outlet end, and a first mounting surface extending between the inlet end and the outlet end. An interior of the gas manifold mounting block comprises two or more gas distribution flow paths, a gas mixing region, and a gas outlet defined within the outlet end of the gas manifold mounting block. Each gas distribution flow path comprises a gas inlet and a gas flow channel coupled to the gas inlet. Each gas inlet is defined within the inlet end of the gas manifold mounting block and is configured to receive a gas. The gas mixing region within the interior of the gas manifold mounting block is fluidly coupled to each gas flow channel. The gas outlet within the interior of the gas manifold mounting block is fluidly coupled to the gas mixing region. Each gas flow control station comprises a flow sensor and a control valve. Each gas flow control station is further mounted onto the first mounting surface of the gas manifold mounting block and coupled to a corresponding gas distribution flow path within the interior of the gas manifold mounting block via one or more gas flow apertures formed in the first mounting surface such that the flow sensor and control valve are in fluid communication with the gas flow channel within the interior of the gas manifold mounting block. The controller is mounted onto the first mounting surface of the gas manifold mounting block and is electrically coupled to each gas flow control station. The controller is programmed to provide a control signal to each control valve for controlling a position of each control valve such that a desired gas flow is produced. The controller is further programmed to utilize a gas flow recipe program to automatically receive and process measured gas flow signals indicative of a flow rate of a gas flowing through each gas flow channel from each flow sensor and adjust a position of each control valve to regulate gas flow based on the measured gas flow signals in order to maintain a desired mass of gas flow for two or more gases to be released from the gas outlet.

In further embodiments, a multi-line mass flow device is provided comprising a cluster mass flow control manifold and a multi-inlet manifold. The cluster mass flow control manifold comprises a controller, a gas manifold mounting block, and two or more gas flow control stations. An exterior of the gas manifold mounting block comprises an inlet end, an outlet end, and a first mounting surface extending between the inlet end and the outlet end. An interior of the gas manifold mounting block comprises two or more gas distribution flow paths, a gas mixing region, and a gas outlet defined within the outlet end of the gas manifold mounting block. Each gas distribution flow path comprises a gas inlet and a gas flow channel coupled to the gas inlet. Each gas inlet is defined within the inlet end of the gas manifold mounting block and is configured to receive a gas. The gas mixing region within the interior of the gas manifold mounting block is fluidly coupled to each gas flow channel. The gas outlet within the interior of the gas manifold mounting block is fluidly coupled to the gas mixing region. Each gas flow control station comprises a flow sensor and a control valve. Each gas flow control station is further mounted onto the first mounting surface of the gas manifold mounting block and coupled to a corresponding gas distribution flow path within the interior of the gas manifold mounting block via one or more gas flow apertures formed in the first mounting surface such that the flow sensor and control valve are in fluid communication with the gas flow channel within the interior of the gas manifold mounting block. The controller is mounted onto the first mounting surface of the gas manifold mounting block and is electrically coupled to each gas flow control station. The controller is programmed to provide a control signal to each control valve for controlling a position of each control valve such that a desired gas flow is produced. The controller is further programmed to utilize a gas flow recipe program to automatically receive and process measured gas flow signals indicative of a flow rate of a gas flowing through each gas flow channel from each flow sensor and adjust a position of each control valve to regulate gas flow based on the measured gas flow signals in order to maintain a desired mass of gas flow for two or more gases to be released from the gas outlet. The multi-inlet manifold comprising a multi-inlet mounting block, and two or more isolation valves mounted on the multi-inlet mounting block. An interior of the multi-inlet mounting block comprises two or more multi-line inlets, two or more multi-line passageways, and two or more multi-line outlets. The two or more multi-line passageways of the multi-inlet mounting block are fluidly coupled to the two or more multi-line inlets and the two or more multi-line outlets. The two or more multi-line outlets of the multi-inlet mounting block are fluidly coupled to the two or more gas distribution flow paths of the gas manifold mounting block. Each isolation valve is fluidly coupled to a corresponding multi-line passageway.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of cluster mass flow devices, examples of which are illustrated in the accompanying drawings. Whenever possible, the same reference numerals will be used throughout the drawings to refer to the same or like parts. Described herein are mass flow devices that control the delivery of two or more fluids to a process chamber. As used herein, the term "fluid" refers to a gas, liquid or combinations thereof, according to the conventional use of the term in the sciences, and refers to all such materials unless otherwise limited herein.

Figure 1A:
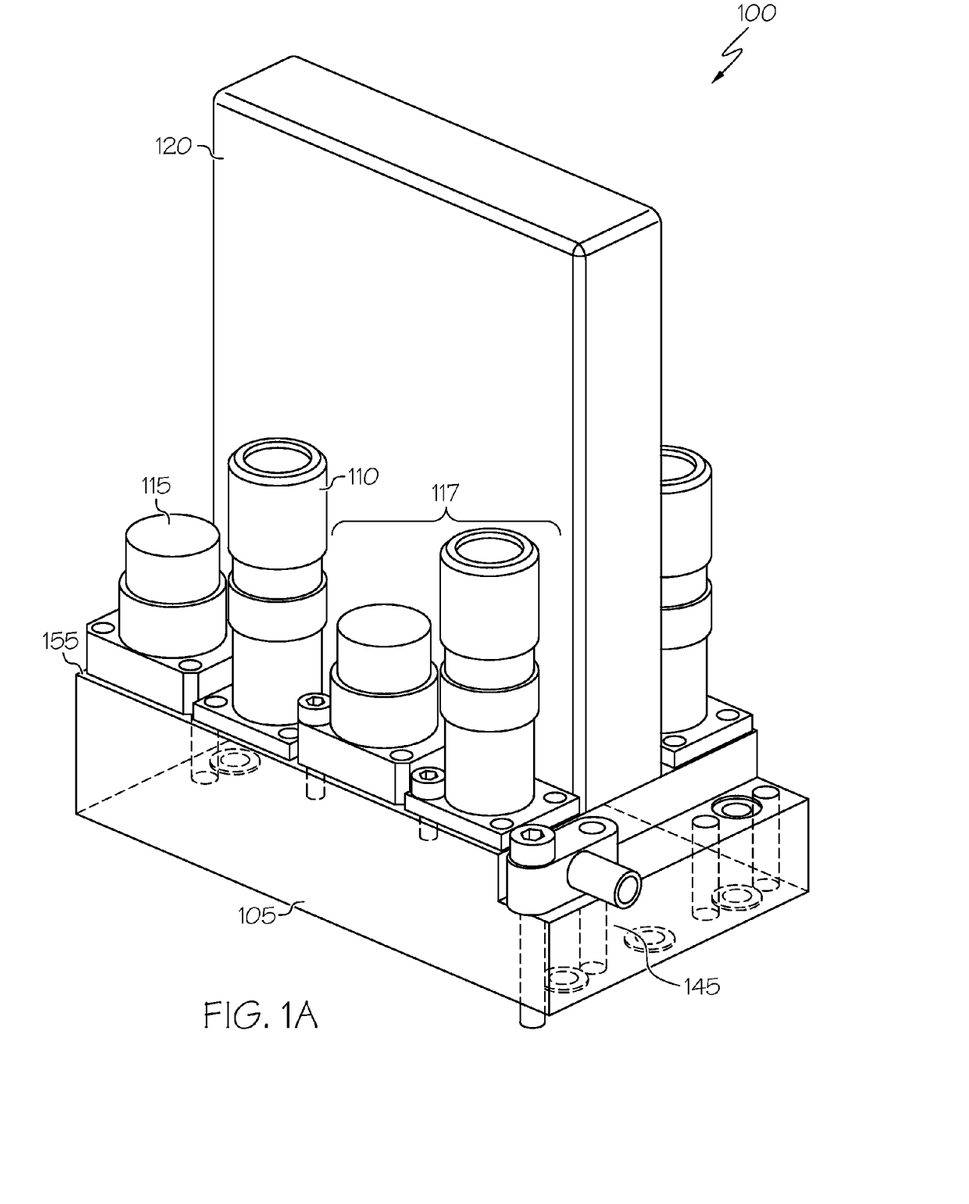
FIG. 1A graphically depicts a top perspective view of a cluster mass flow device according to one or more embodiments shown or described herein.

Referring to FIG. 1A, depicted is a top perspective view of cluster mass flow device 100 comprising a gas manifold or gas manifold mounting block 105, two or more control valves 110 and two or more flow sensors 115. Also pictured are two or more gas flow control stations 117, each gas flow control station 117 comprised of a control valve 110, and a flow sensor 115. A controller enclosure 120 is shown which contains a controller (not pictured) inside. The terms "gas manifold," "gas manifold mounting block," or "gas manifold block" are used interchangeably herein.

Figure 1B:
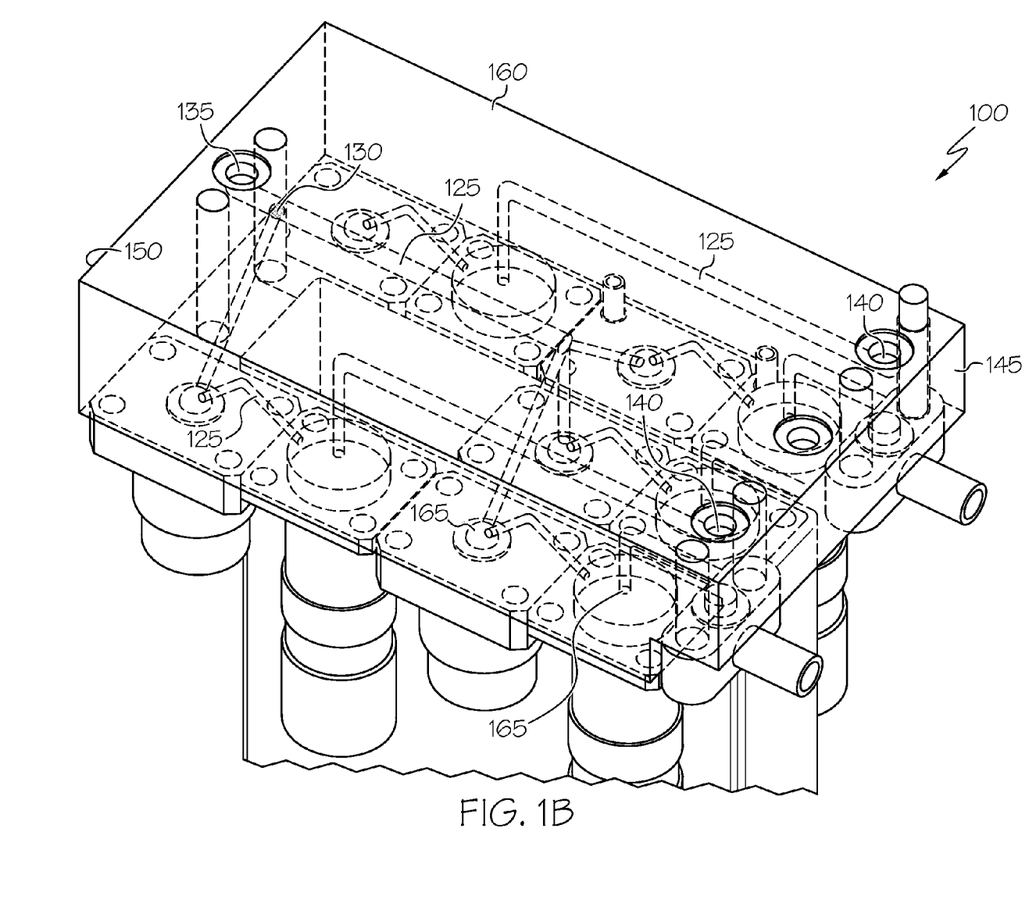
FIG. 1B graphically depicts a bottom perspective view of the cluster mass flow device of FIG. 1A.

Referring to FIG. 1B, which depicts a bottom perspective view of the cluster mass flow device 100, the gas manifold mounting block 105 comprises two or more gas distribution flow paths, a gas mixing region 130, and a gas outlet 135. Each gas distribution flow path of the gas manifold 105 comprises a gas inlet 140 configured to receive a gas, and a gas flow channel 125 coupled to the gas inlet 140. The gas mixing region 130 of the gas manifold 105 is fluidly coupled to each gas flow channel 125. Each gas flow channel 125 may converge into gas mixing region 130. The gas outlet 135 of the gas manifold 105 is fluidly coupled to the gas mixing region 130. The flow channel between the gas mixing region 130 and the gas outlet 135 may allow for mixing of the gases. In some embodiments herein, the gas manifold 105 may comprise a second gas mixing region. The second gas mixing region may allow a portion of the inlet gases to be mixed prior to combination with the remaining inlet gases. In other embodiments herein, the gas manifold 105 may be configured to provide two or more separate flow streams of gas mixtures. The gas mixing region 130 may be fluidly coupled to some gas flow channels 125, while a second gas mixing region of the gas manifold 105 may be fluidly coupled to the remaining gas flow channels 125. A second gas outlet of the gas manifold 105 may be fluidly coupled to the second gas mixing region. It should also be understood that the gas manifold 105 may be adaptable to provide virtually any desired x-number (e.g., 12) of inlet gas streams, and any desired y-number (e.g., 5) of different outlet gas streams.

Each gas inlet 140, through which inlet gases may flow, is fluidly coupled to a gas source (not pictured). The gas source may be a single gas source or may be a gas mixture source. In some embodiments herein, the inlet gases, or a subset of the inlet gases, may not be combined at all and may be directed to the processing chamber without mixing. In other embodiments herein, the inlet gases, or a subset of the inlet gases, may be combined to form one or more gas mixtures that may be directed to the processing chamber.

In embodiments herein, the gas manifold 105 may be a grooved block formed from solid materials suitable for handling gas streams. Examples of suitable solid materials may include, for example, corrosion-resistant stainless steel, ferrite, aluminum, aluminum alloy, glass ceramic, silica, crystal quartz, PTFE, or polycarbonate, or combinations thereof. The gas manifold 105 has an exterior and an interior. The exterior of the gas manifold 105 comprises an inlet end 145, an outlet end 150, the outlet end 150 extending along an opposite side of the inlet end 145, a first mounting surface 155 extending between the inlet end 145 and the outlet end 150, and a second mounting surface 160 extending between the inlet end 145 and the outlet end 150. The first and second mounting surfaces extend along opposite sides of the gas manifold 105. The interior of the gas manifold 105 includes the two or more gas distribution flow paths, the gas mixing region 130, and the gas outlet 135.

Each gas inlet 140 is depicted in FIG. 1B as defined within the second mounting surface 160 towards the inlet end 145. The gas outlet 135 is defined within the second mounting surface 160 towards the outlet end 150. It should be appreciated that each gas inlet 140 and the gas outlet 135 may be defined other parts of the gas manifold 105. For example, each gas inlet 140 and the gas outlet 135 may be defined in the inlet end 145 and outlet end 150, respectively.

Each flow sensor 115 and control valve 110 (each gas flow control station 117) may be mounted on the first mounting surface 155 of the gas manifold 105, and are fluidly coupled to a corresponding gas flow channel 125 of the gas distribution flow path. In some embodiments herein, at least one of the two more flow sensors 115 and at least one of the two or more control valves 110 (i.e., at least one of the two or more gas flow control stations 117) may be mounted on the second mounting surface 160 of the gas manifold 105, and is fluidly coupled to a corresponding gas flow channel 125 of the gas distribution flow path. Each flow sensor 115 and control valve 110 (gas flow control station 117) may be fluidly coupled to a corresponding gas flow channel 125 of the gas distribution flow path via one or more gas flow apertures 165 formed in the first and/or second mounting surfaces 155, 160 of the gas manifold 105.

Each flow sensor 115 may be positioned either upstream or downstream of the control valve 110. In some embodiments herein, the flow sensor 115 is positioned between the control valve 110 and the gas mixing region 130, and downstream of the control valve 110.

In embodiments herein, each flow sensor 115 may comprise a sensor conduit and a sensor assembly operatively coupled to the sensor conduit to generate a measured signal representative of a flow rate of a fluid through the sensor conduit. The sensor conduit may be fluidly coupled to a gas flow channel 125 of the gas distribution flow path. The sensor conduit may be fluidly coupled either directly or using a bypass channel. In some embodiments herein, the sensor measures an associated pressure drop or pressure differential, ΔP, across the sensor conduit to determine the fluid flow rate or amount. It should be understood that other suitable flow sensors may be used for measuring a flow rate of a fluid through the gas distribution flow path, and may include, for example, thermal flow meters and coriolis force flow meters.

Each control valve 110 is fluidly coupled to each flow sensor, and operates to limit the rate or amount of fluid flowing therethrough to a target or desired predetermined value. Each control valve 110 may comprise a valve body having a fluid flow path inline with the gas flow channel 125, a valve disc located in the fluid flow path of the control valve body, and an actuator coupled to the valve disc for actuating the valve disc. The actuator controls the degree to which the valve opens, and therefore, controls the rate or amount of fluid flowing therethrough to produce a desired gas flow. It should be understood that other control valves 110 may be used for controlling a rate or amount of fluid flow.

The controller may further comprise the controller enclosure 120. In some embodiments herein, a gas flow control station 117 (flow sensor 115 and control valve 110) may be positioned within the controller enclosure 120 and mounted onto the first mounting surface 155 of gas manifold 105.

The controller may be mounted on the first mounting surface 155 of the gas manifold 105 within the controller enclosure 120, and is electrically coupled to each control valve 110 and to each flow sensor 115 (or to each gas flow control station 117). Each gas flow control station 117 (control valve 110 and flow sensor 115) and the controller may be mounted onto the first and/or second mounting surfaces 155, 160 such that spacing between the gas flow control stations 117 (control valve 110 and flow sensor 115) and controller are minimized. In some embodiments herein, the gas flow control stations 117 (control valve 110 and flow sensor 115) and the controller are positioned on the first mounting surface 155 of the gas manifold 105 such that a surface area portion of the first mounting surface 155 occupied by the gas flow control stations 117 (control valve 110 and flow sensor 115) and the controller exceeds a non-occupied surface area portion of the first mounting surface 155. The gas flow control stations 117 (control valve 110 and flow sensor 115) may be positioned symmetrically about the controller enclosure 120 on the first mounting surface 155 of the gas manifold 105.

The controller may comprise one or more processors adapted to receive one or more input signals and output one or more output signals. The controller is programmed to provide a control signal to each control valve 110 for controlling a position of each control valve 110 such that a desired fluid flow is produced. The controller may modify the position of each control valve 110 in response to one or more input signals received. The controller is further programmed to utilize a gas flow recipe program to automatically receive and process measured gas flow signals indicative of a flow rate of a gas flowing through each gas flow channel from each flow sensor 115 and adjust a position of each control valve 110 to regulate gas flow based on the measured gas flow signals in order to maintain a desired mass of gas flow for two or more gases to be released from the gas outlet. The gas flow recipe program may include one or more desired setpoints for each inlet gas.

The controller may further be operatively coupled and/or configured to, for example, exchange data with one or more data storage devices and/or one or more peripheral devices. The one or more data storage device can be, for example, a disk drive memory, a flash memory device, a RAM memory device, or other device for storing data, or combinations thereof. The data storage device may store information pertinent to the physical configuration of the cluster mass flow device 100, including, for example, programs and data during operation of the cluster mass flow device 100. In some embodiments herein, the data storage devices may be used for storing historical data relating to the parameters over a period of time, as well as operating data. Software, including programming code that implements embodiments of the invention, can be stored on a computer readable and/or writable nonvolatile recording medium, and then may be copied into memory wherein it can then be executed by the controller. Such programming code may be written in any of a plurality of programming languages.

The one or more peripheral devices can be an output device configured to present any information concerning the operation of the cluster mass flow device 100, and may include, for example, a printing device, display screen, or speaker. The one or more peripheral devices can also include one or more input devices, for example, a keyboard, mouse, trackball, microphone, touch screen, and other man-machine interface devices. In addition, the computer system may contain one or more interfaces that can connect the computer system to a communication network.

Figure 2:
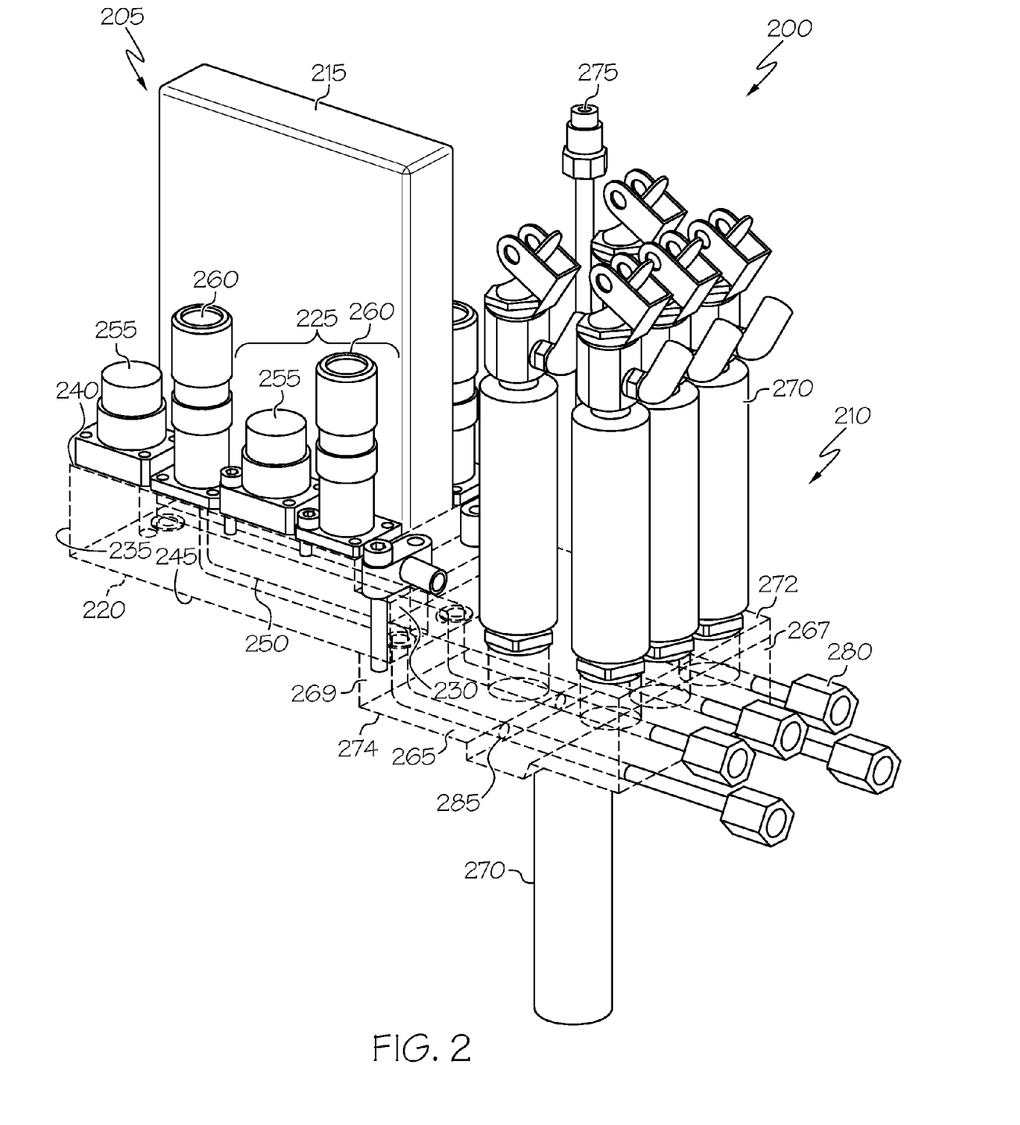
FIG. 2 is a top perspective view of a multi-line mass flow device according to one or more embodiments shown or described herein.

Referring to FIG. 2, depicted is a top perspective view of a multi-line mass flow device 200. The multi-line mass flow device 200 comprises (i) a cluster mass flow device configured as a cluster mass flow control manifold 205 and (ii) a multi-inlet manifold 210. The cluster mass flow control manifold 205 comprises a controller (not pictured) within a controller enclosure 215, a gas manifold mounting block 220, and two or more gas flow control stations 225. The gas manifold mounting block 220 has an exterior and an interior. The exterior of the gas manifold mounting block 220 comprises an inlet end 230, an outlet end 235, the outlet end 235 extending along an opposite side of the inlet end 230, a first mounting surface 240 extending between the inlet end 230 and the outlet end 235, and a second mounting surface 245 extending between the inlet end 230 and the outlet end 235. The first and second mounting surfaces 240, 245 extend along opposite sides of the gas manifold mounting block 220. The interior of the gas manifold mounting block 220 includes the two or more gas distribution flow paths, a gas mixing region, and a gas outlet. The gas outlet may be defined within the outlet end 235 of the gas manifold mounting block 220. Each gas distribution flow path comprises a gas inlet and a gas flow channel 250 coupled to the gas inlet. Each gas inlet may be defined within the inlet end 230 of the gas manifold mounting block 220, and is configured to receive an inlet gas from a gas source. The gas mixing region within the interior of the gas manifold mounting block 220 is fluidly coupled to each gas flow channel 250. The gas outlet within the interior of the gas manifold mounting block 220 is fluidly coupled to the gas mixing region.

Each gas flow control station 225 comprises a flow sensor 255 and a control valve 260. The two or more gas flow control stations 225 may be mounted onto the first mounting surface 240 of the gas manifold mounting block 220. Of course, at least one of the two or more gas flow control stations 225 may be mounted onto the second mounting surface 245 of the gas manifold mounting block 220. Each gas flow control station 225 may be fluidly coupled to a corresponding gas distribution flow path within the interior of the gas manifold mounting block 220 via one or more gas flow apertures formed in the first mounting surface 240 of the gas manifold mounting block 220 such that the flow sensor 255 and control valve 260 (i.e., the gas flow control station 225) are in fluid communication with the gas flow channel 250 within the interior of the gas manifold mounting block 220.

The controller may further comprise the controller enclosure 215. In some embodiments herein, a gas flow control station 225 (flow sensor 255 and control valve 260) may be positioned within the controller enclosure 215 and mounted onto the first mounting surface 240 of the gas manifold mounting block 220. The controller may be mounted on the first mounting surface 240 of the gas manifold mounting block 220 within the controller enclosure 215, and is electrically coupled to each control valve 260 and to each flow sensor 255 (or to each gas flow control station 225).

The controller is programmed to provide a control signal to each control valve 260 for controlling a position of each control valve 260 such that a desired fluid flow is produced. The controller may modify the position of each control valve 260 in response to one or more input signals received. The controller is further programmed to utilize a gas flow recipe program to automatically receive and process measured gas flow signals indicative of a flow rate of a gas flowing through each gas flow channel from each flow sensor 255 and adjust a position of each control valve 260 to regulate gas flow based on the measured gas flow signals in order to maintain a desired mass of gas flow for two or more gases to be released from the gas outlet. The gas flow recipe program may include one or more desired setpoints for each inlet gas.

The multi-inlet manifold 210 comprises a multi-inlet mounting block 265 and two or more isolation valves 270 mounted on the multi-inlet mounting block 265. The multi-inlet manifold 210 may further comprise a purge port 275. In embodiments herein, the multi-inlet mounting block 265 may be a grooved block formed from solid materials suitable for handling gas streams. The multi-inlet mounting block 265 is configured to provide two or more separate gas flow streams. Examples of suitable solid materials may include, for example, corrosion-resistant stainless steel, ferrite, aluminum, aluminum alloy, glass ceramic, silica, crystal quartz, PTFE, or polycarbonate. The multi-inlet mounting block 265 has an exterior and an interior. The exterior of the multi-inlet mounting block 265 has a multi-line inlet end 267, a multi-line outlet end 269, the multi-line outlet end 269 extending along an opposite side of the multi-line inlet end 267, a top mounting surface 272 extending between the multi-line inlet end 267 and the multi-line outlet end 269, and a bottom mounting surface 274 extending between the multi-line inlet end 267 and the multi-line outlet end 269 of multi-inlet mounting block 265. The top and bottom mounting surfaces 272, 274 extend along opposite sides of the multi-inlet mounting block 265. An interior of the multi-inlet mounting block 265 comprises two or more multi-line inlets 280, two or more multi-line passageways 285, and two or more multi-line outlets (not pictured). It should be understood that the multi-inlet mounting block 265 may be adaptable to provide virtually any desired m-number (e.g., 12) of inlet and outlet gas streams.

Each multi-line passageway 285 is fluidly coupled to a corresponding multi-line inlet 280, multi-line outlet, and isolation valve 270. Each multi-line passageway 285 is also fluidly coupled to a corresponding gas flow channel 250 of the cluster mass flow control manifold 205. Each multi-line inlet 280, through which inlet gases may flow, is fluidly coupled to a gas source (not pictured). The gas source may be a single gas source or may be a gas mixture source.

In embodiments herein, the isolation valve 270 is operable for blocking a fluid flow through the multi-line passageway 285. The isolation valve 270 may comprise a valve body having a fluid flow path inline with the multi-line passageway 285, a valve disc located in the fluid flow path of the valve body, and an actuator coupled to the valve disc for actuating the valve disc between an open position and a closed position. It should be understood that other isolation valves 270 may be used for allowing or blocking fluid flow through the multi-line passageway 285. In embodiments herein, the purge port 275 comprises an inlet for receipt of a purge gas. Purge gas may be supplied through a separate input line (not pictured) attached to purge port 275.

In embodiments herein, at least one isolation valve 270 may be mounted on the top mounting surface 272 of the multi-inlet mounting block 265, and is fluidly coupled to a corresponding multi-line passageway 285. In some embodiments herein, at least one isolation valve 270 may be mounted on the bottom mounting surface 274 of the multi-inlet mounting block 265, and is fluidly coupled to a corresponding multi-line passageway 285. Each isolation valve 270 may be fluidly coupled to a corresponding multi-line passageway 285 via one or more gas flow apertures formed in the top and/or bottom mounting surfaces 272, 274 of the multi-inlet mounting block 265.

Figure 3:
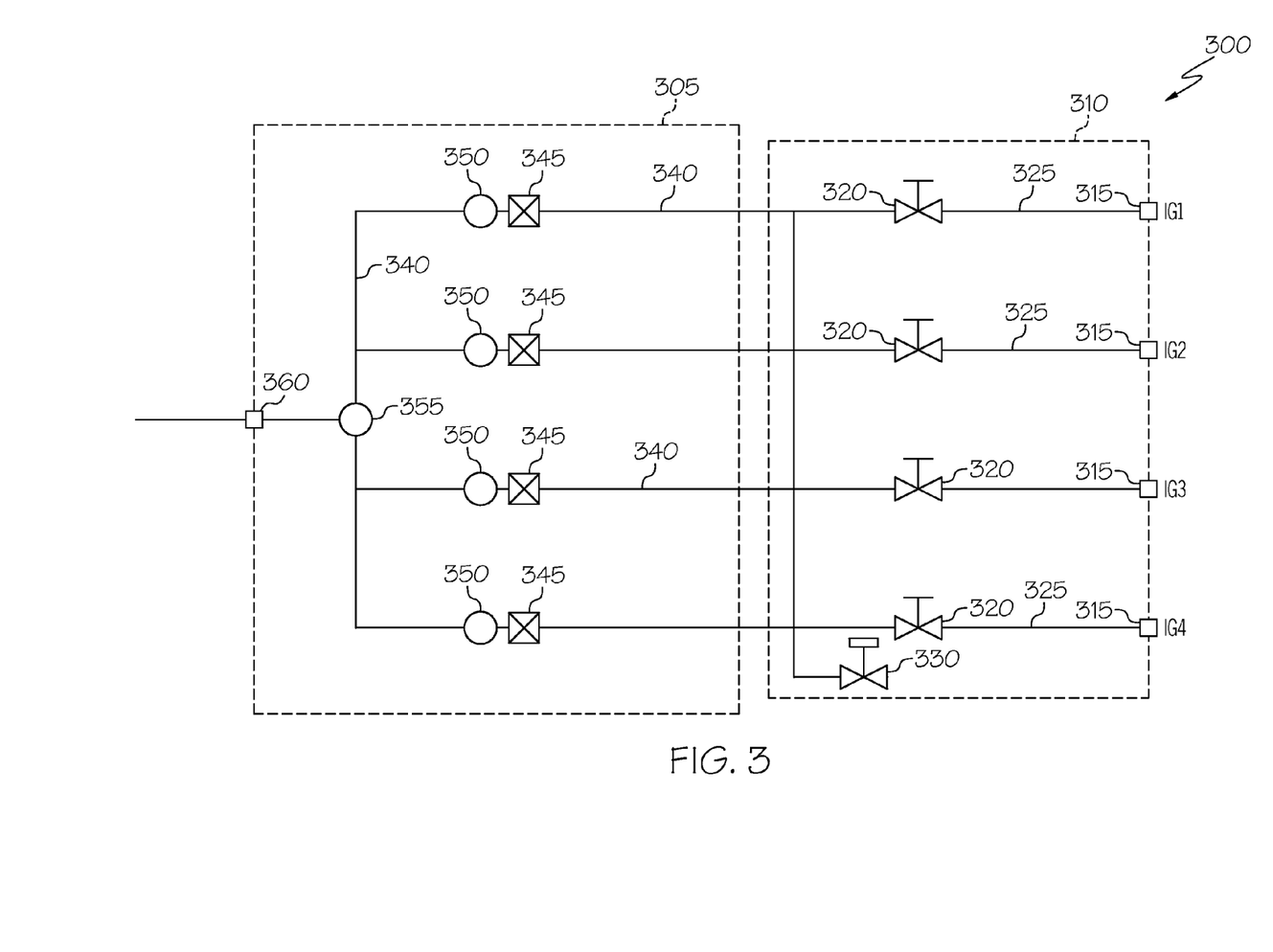
FIG. 3 is a gas flow schematic of a multi-line mass flow device according to one or more embodiments shown or described herein.

Referring to FIG. 3, depicted is a gas flow schematic of a multi-line mass flow device 300 comprising a cluster mass flow control device/manifold 305 and a multi-inlet manifold 310. Inlet gases 1-4 are introduced into the multi-inlet manifold 310 through multi-line inlet 315. Inlet gases flow through multi-line passageways 325, through isolation valves 320, purge port 330 to the multi-line exit. The multi-line exit is fluidly coupled to the gas inlet of cluster mass flow control device/manifold 305. The inlet gases flow through gas flow channels 340 and through control valve 345 and flow sensor 350 to mixing point 355. The gases pass through gas outlet 360 of cluster mass flow control device/manifold 305 and either to another cluster mass flow control device/manifold or to the process chamber.

Figure 4A:
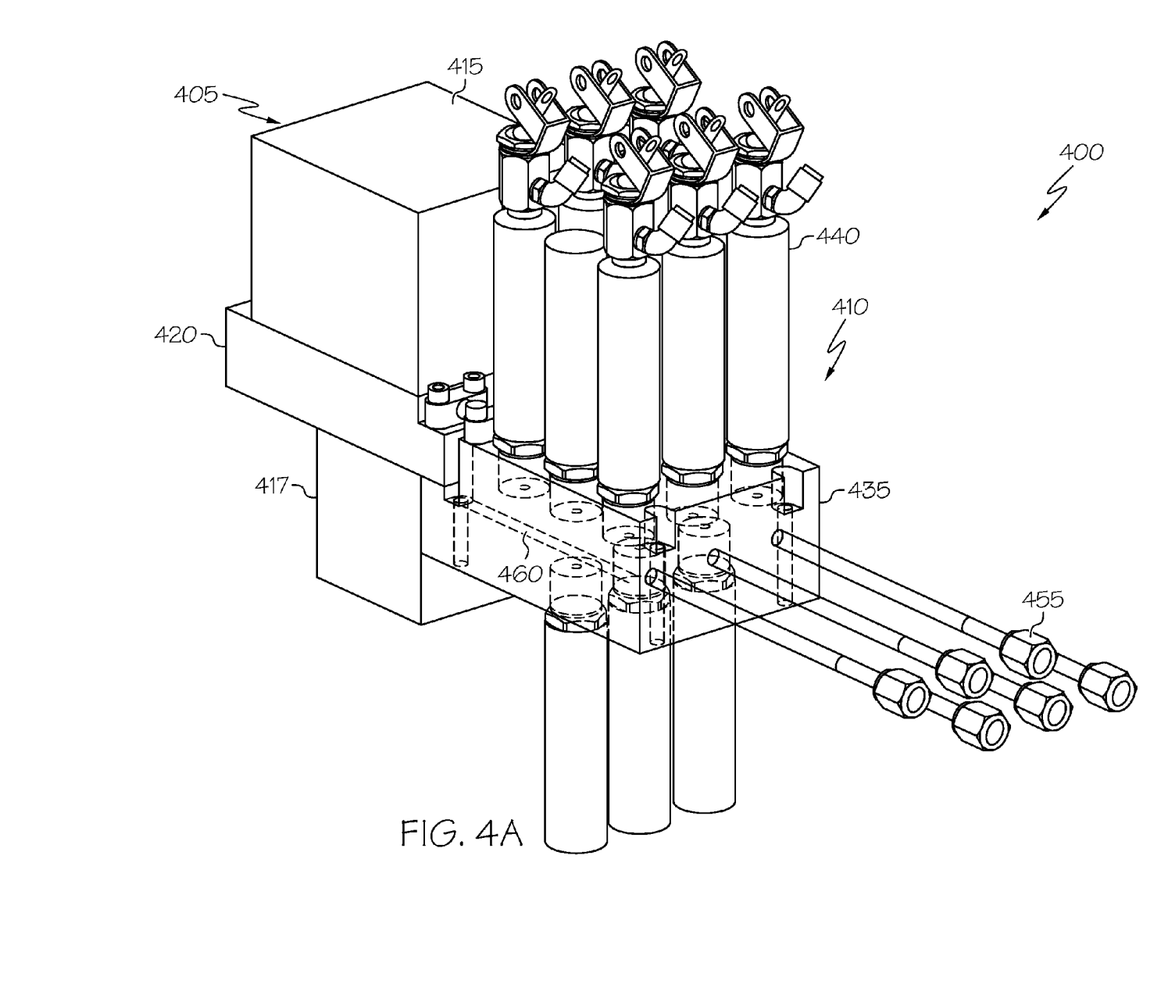
FIG. 4A graphically depicts a perspective view of a multi-line mass flow device according to one or more embodiments shown or described herein.
Figure 4B:
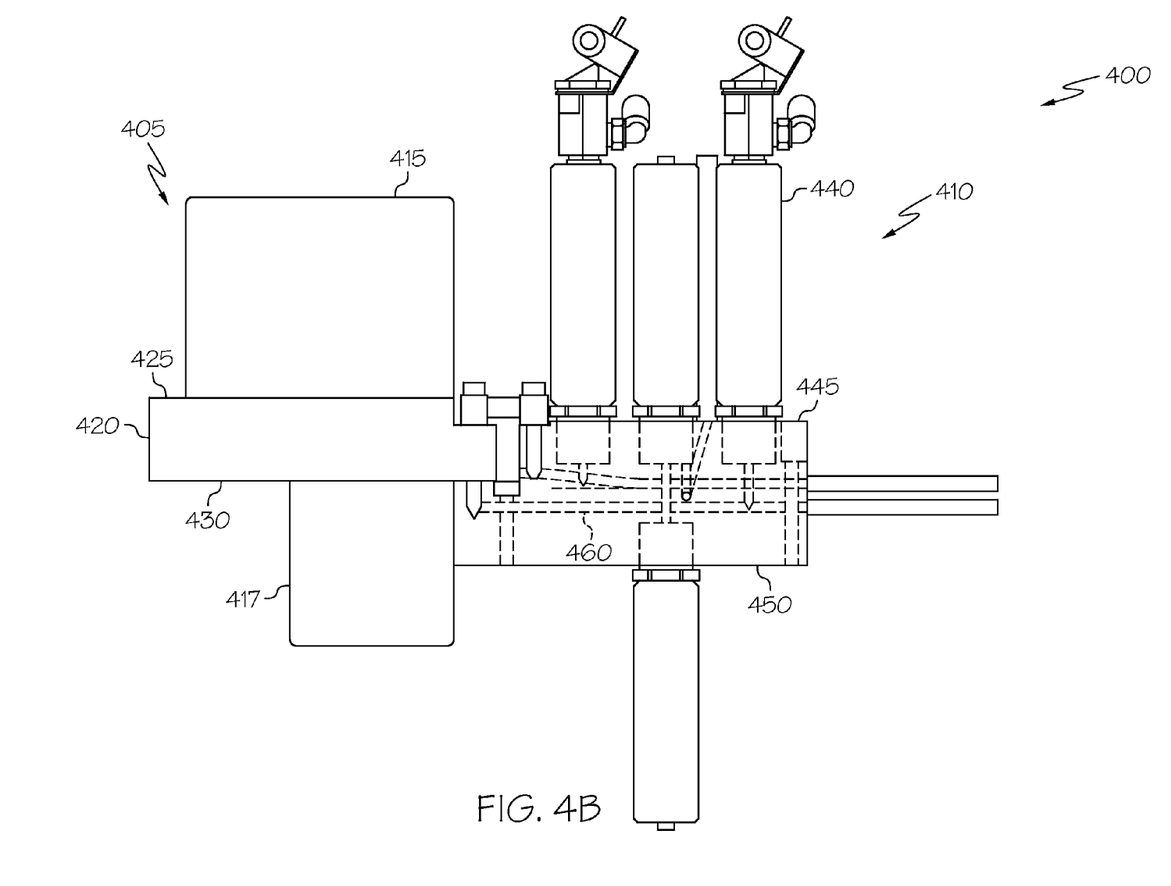
FIG. 4B graphically depicts a side view of the cluster mass flow device of FIG. 4A.

Referring to FIGS. 4A & 4B, depicted is a perspective view of a multi-line mass flow device 400. The multi-line mass flow device 400 comprises (i) a cluster mass flow device configured as a cluster mass flow control manifold 405 and (ii) a multi-inlet manifold 410. The cluster mass flow control manifold 405 comprises one or more controllers (not pictured) positioned within a controller enclosure 415, 417 a gas manifold mounting block 420, and two or more gas flow control stations (not pictured) positioned within a controller enclosure 415, 417. The gas manifold mounting block 420 has an exterior and an interior. The exterior of the gas manifold mounting block 420 comprises an inlet end, an outlet end, the outlet end extending along an opposite side of the inlet end, a first mounting surface 425 extending between the inlet end and the outlet end, and a second mounting surface 430 extending between the inlet end and the outlet end. The first and second mounting surfaces 425, 430 extend along opposite sides of the gas manifold mounting block 420. The interior (not pictured) of the gas manifold mounting block 420 includes the two or more gas distribution flow paths, one or more gas mixing regions, and a gas outlet. The gas outlet may be defined within the outlet end of the gas manifold mounting block 420. Each gas distribution flow path comprises a gas inlet and a gas flow channel coupled to the gas inlet. Each gas inlet may be defined within the inlet end of the gas manifold mounting block 420, and is configured to receive an inlet gas from a gas source. The one or more gas mixing region within the interior of the gas manifold mounting block 420 is fluidly coupled to one or more gas flow channels. The gas outlet within the interior of the gas manifold mounting block 420 may be fluidly coupled to one or more gas mixing regions.

Each gas flow control station is described above with reference to FIGS. 1A, 1B, & 2. The controller may further comprise the controller enclosure 415, 417. In some embodiments herein, all gas flow control station may be positioned within the controller enclosure 415, 417 and mounted onto the surface of the gas manifold mounting block 420. The controller may be electrically coupled to each gas flow control station. The controller may be programmed as described above with reference to FIG. 2.

The multi-inlet manifold 410 comprises a multi-inlet mounting block 435 and two or more isolation valves 440 mounted on a surface of the multi-inlet mounting block 435. The multi-inlet mounting block 435 may be formed as described above with reference to FIG. 2. The multi-inlet mounting block 435 has an exterior and an interior. The exterior of the multi-inlet mounting block 435 has a multi-line inlet end, a multi-line outlet end, the multi-line outlet end extending along an opposite side of the multi-line inlet end, a top mounting surface 445 extending between the multi-line inlet end and the multi-line outlet end, and a bottom mounting surface 450 extending between the multi-line inlet end and the multi-line outlet end of multi-inlet mounting block 435. The top and bottom mounting surfaces 445, 450 extend along opposite sides of the multi-inlet mounting block 435. An interior of the multi-inlet mounting block 435 comprises two or more multi-line inlets 455, two or more multi-line passageways 460, and two or more multi-line outlets (not pictured). It should be understood that the multi-inlet mounting block 435 may be adaptable to provide virtually any desired m-number (e.g., 12) of inlet and outlet gas streams.

Each multi-line passageway 460 is fluidly coupled to a corresponding multi-line inlet 455 and multi-line outlet. Each multi-line passageway 460 is also fluidly coupled to a corresponding gas flow channel of the cluster mass flow control manifold 405. Each multi-line inlet 455, through which inlet gases may flow, is fluidly coupled to a gas source (not pictured). The gas source may be a single gas source or may be a gas mixture source.

The isolation valve 440 is operable for blocking a fluid flow through the multi-line passageway 460. The isolation valve 440 may comprise a valve body having a fluid flow path inline with the multi-line passageway 460, a valve disc located in the fluid flow path of the valve body, and an actuator coupled to the valve disc for actuating the valve disc between an open position and a closed position. The isolation valve 440 is fluidly coupled to a corresponding multi-line passageway 460 via one or more gas flow apertures formed in the mounting surfaces of the multi-inlet mounting block 435. It should be understood that other isolation valves 440 may be used for allowing or blocking fluid flow through the multi-line passageway 460. In embodiments herein, the multi-inlet manifold 410 may further comprise a purge port as described above with reference to FIG. 2.

In embodiments herein, the multi-inlet manifold 410 may further comprise one or more diverter valves positioned between the cluster mass flow control manifold 405 and the multi-inlet manifold 410. The diverter valve may be fluidly coupled to a gas inlet of the cluster mass flow control manifold 405 and to a gas outlet of the multi-inlet manifold 410. The diverter valve may be used to divert one or more gases to a different gas distribution flow path within the cluster mass flow control manifold 405.

Figure 5:
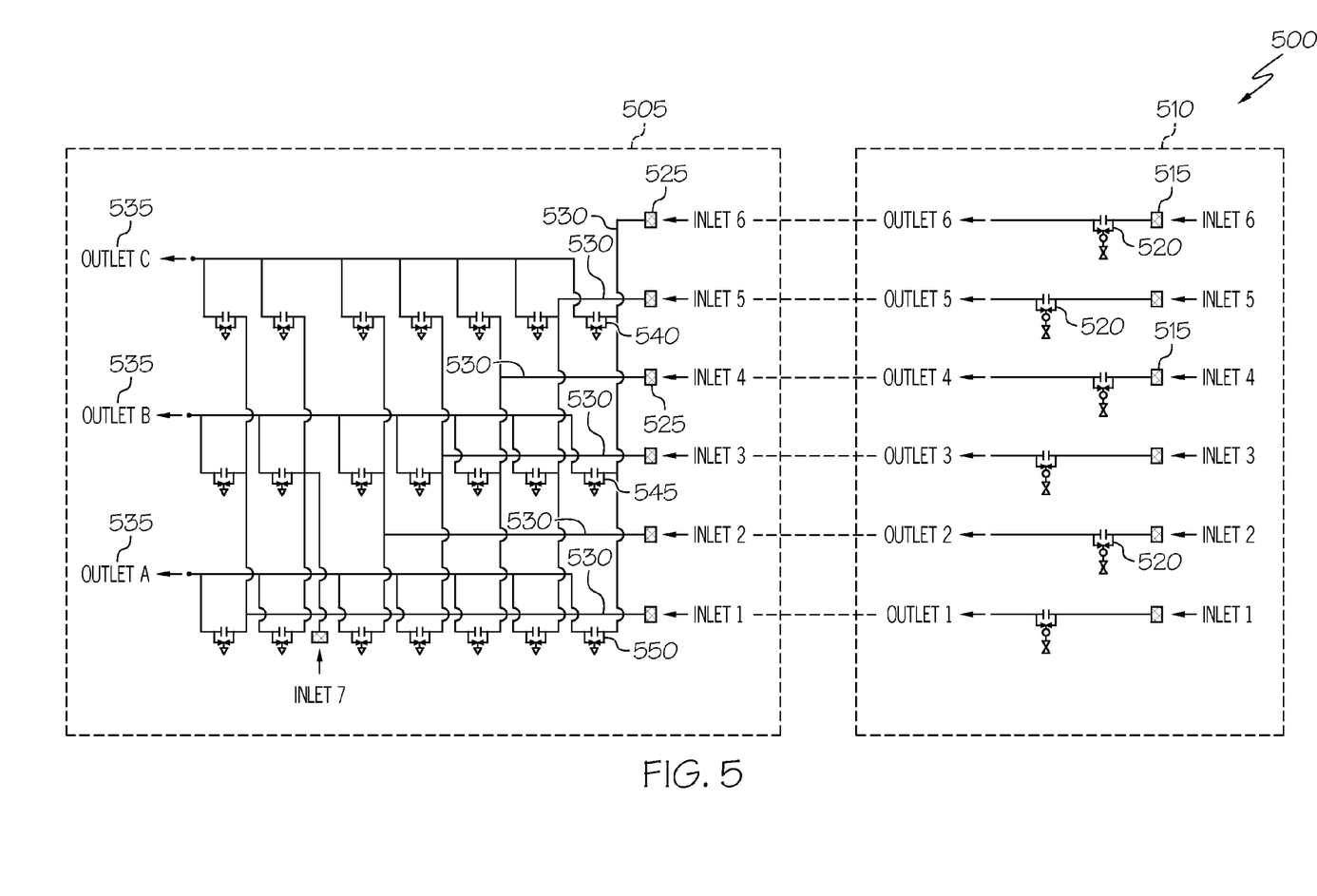
FIG. 5 is a gas flow schematic of a diverter and multi-inlet manifold according to one or more embodiments shown or described herein.

Referring to FIG. 5, depicted is a gas flow schematic 500 of a diverter 505 fluidly coupled to a multi-inlet manifold 510. The diverter 505 may comprise one or more diverter valves configured to divert one or more gases to one or more outlets. Inlet gases 1-6 are introduced into the multi-inlet manifold 510 through multi-line inlet 515. Inlet gases flow through multi-line passageways, through isolation valves 520 to the multi-line outlet. Each multi-line outlet is fluidly coupled to a gas inlet 525 of the diverter 505. An inlet gas flows through each gas inlet 525 and respective gas flow channel 530 of the diverter 505 to one or more outlets 535. For example, an inlet gas may be supplied to inlet 6 and fed through gas flow channel 530 to a first line valve 540. The first line valve 540 may adapted to direct a portion or all of the inlet gas to outlet C or on to a second line valve 545. The second line valve 545 may be adapted to direct a portion or all of the inlet gas to outlet B, or on to a third line valve 550. The third line valve 550 may be adapted to direct a portion or all of the inlet gas to outlet A. Each inlet gas line has a similar arrangement to direct its respective gas to one or more outlets 535 using one or more line valves 540, 545, 550. It should be understood that multiposition selectors may be used as an alternative to line valves in order to direct an inlet gas to one or more outlets 535. The gases exiting the one or more outlets 535 may be sent to a cluster mass flow control device/manifold. Inlet 7 may be used as a purge port or to introduce an additional process gas to the diverter 505.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A cluster mass flow device comprising a controller, a gas manifold, two or more control valves, and two or more flow sensors, wherein:
the controller is electrically coupled to each control valve and to each flow sensor;
the gas manifold comprises two or more gas distribution flow paths and a gas mixing region each arranged within an interior of a gas manifold block having at least one mounting surface, and a gas outlet;
each gas distribution flow path of the gas manifold comprises a gas inlet defined within the at least one mounting surface of the gas manifold block and configured to receive a gas, and a gas flow channel fluidly coupled to the gas inlet;
the gas mixing region of the gas manifold is fluidly coupled to each gas flow channel;
the gas outlet of the gas manifold is defined within the at least one mounting surface of the gas manifold block and is fluidly coupled to the gas mixing region;
each flow sensor and each control valve are fluidly coupled to a corresponding gas flow channel of the gas distribution flow path;
each flow sensor is positioned between the control valve and the gas mixing region, and downstream of the control valve;
the controller is programmed to provide a control signal to each control valve for controlling a position of each control valve such that a desired gas flow is produced; and
the controller is further programmed to utilize a gas flow recipe program to automatically receive and process measured gas flow signals indicative of a flow rate of the gas flowing through each gas flow channel from each flow sensor and adjust a position of each control valve to regulate gas flow based on the measured gas flow signals in order to maintain a desired mass of gas flow for two or more gases to be released from the gas outlet.

2. The device of claim 1, wherein:
an exterior of the gas manifold comprises an inlet end and an outlet end, and the at least one mounting surface includes a first mounting surface extending between the inlet end and the outlet end;
each gas inlet is defined within the inlet end of the gas manifold; and
the gas outlet is defined within the outlet end of the gas manifold.

3. The device of claim 2, wherein the controller is mounted onto the first mounting surface of the gas manifold.

4. The device of claim 2, wherein at least one of the two or more flow sensors and at least one of the two or more control valves are mounted onto the first mounting surface of the gas manifold.

5. The device of claim 2, wherein at least one of the two or more flow sensors and at least one of the two or more control valves are mounted onto the first mounting surface of the gas manifold and are fluidly coupled to the corresponding gas flow channel of the gas distribution flow path via one or more gas flow apertures formed in the first mounting surface of the gas manifold.

6. The device of claim 2, wherein:
the at least one mounting surface further comprises a second mounting surface extending between the inlet end and the outlet end of the gas manifold; and
the first and second mounting surfaces extend along opposite sides of the gas manifold.

7. The device of claim 6, wherein at least one of the two or more flow sensors and at least one of the two or more control valves are mounted onto the second mounting surface of the gas manifold and is fluidly coupled to the corresponding gas flow channel of the gas distribution flow path via one or more gas flow apertures formed in the second mounting surface of the gas manifold.

8. The device of claim 1, wherein:
the controller comprises a controller enclosure; and
at least one of the two or more flow sensors and at least one of the two or more control valves are positioned within the controller enclosure.

9. A cluster mass flow device comprising a controller, a gas manifold mounting block, and two or more gas flow control stations, wherein:
an exterior of the gas manifold mounting block comprises an inlet end, an outlet end, and a first mounting surface extending between the inlet end and the outlet end;
an interior of the gas manifold mounting block comprises two or more gas distribution flow paths, a gas mixing region, and a gas outlet defined within the outlet end of the gas manifold mounting block;
each gas distribution flow path comprises a gas inlet and a gas flow channel coupled to the gas inlet;
each gas inlet is defined within the inlet end of the gas manifold mounting block and is configured to receive a gas;
the gas mixing region within the interior of the gas manifold mounting block is fluidly coupled to each gas flow channel;
the gas outlet within the interior of the gas manifold mounting block is fluidly coupled to the gas mixing region;
each gas flow control station comprises a flow sensor and a control valve;
each gas flow control station is mounted onto the first mounting surface of the gas manifold mounting block and is coupled to a corresponding gas distribution flow path within the interior of the gas manifold mounting block via one or more gas flow apertures formed in the first mounting surface such that the flow sensor and control valve are in fluid communication with the gas flow channel within the interior of the gas manifold mounting block;
the controller is mounted onto the first mounting surface of the gas manifold mounting block and is electrically coupled to each gas flow control station;
the controller is programmed to provide a control signal to each control valve for controlling a position of each control valve such that a desired gas flow is produced; and
the controller is further programmed to utilize a gas flow recipe program to automatically receive and process measured gas flow signals indicative of a flow rate of the gas flowing through each gas flow channel from each flow sensor and adjust a position of each control valve to regulate gas flow based on the measured gas flow signals in order to maintain a desired mass of gas flow for two or more gases to be released from the gas outlet.

10. The device of claim 9, wherein:
the gas manifold mounting block further comprises a second mounting surface extending between the inlet end and the outlet end of the gas manifold mounting block;
the first and second mounting surfaces extend along opposite sides of the gas manifold mounting block.

11. The device of claim 10, wherein at least one of the two or more gas flow control stations is mounted onto the second mounting surface of the gas manifold mounting block and is coupled to the corresponding gas distribution flow path within the interior of the gas manifold mounting block via one or more gas flow apertures formed in the second mounting surface such that the flow sensor and control valve are in fluid communication with the gas flow channel within the interior of the gas manifold mounting block.

12. The device of claim 9, wherein each flow sensor is positioned between the control valve and the gas mixing region, and downstream of the control valve.

13. A multi-line mass flow device comprising a cluster mass flow control manifold and a multi-inlet manifold, wherein:
the cluster mass flow control manifold comprises a controller, a gas manifold mounting block, and two or more gas flow control stations;
an exterior of the gas manifold mounting block comprises an inlet end, an outlet end, and a first mounting surface extending between the inlet end and the outlet end;
an interior of the gas manifold mounting block comprises two or more gas distribution flow paths, a gas mixing region, and a gas outlet defined within the outlet end of the gas manifold mounting block;
each gas distribution flow path comprises a gas inlet and a gas flow channel coupled to the gas inlet;
each gas inlet is defined within the inlet end of the gas manifold mounting block and is configured to receive a gas;
the gas mixing region within the interior of the gas manifold mounting block is fluidly coupled to each gas flow channel;
the gas outlet within the interior of the gas manifold mounting block is fluidly coupled to the gas mixing region;
each gas flow control station comprises a flow sensor and a control valve;
each gas flow control station is mounted onto the first mounting surface of the gas manifold mounting block and is coupled to a corresponding gas distribution flow path within the interior of the gas manifold mounting block via one or more gas flow apertures formed in the first mounting surface such that the flow sensor and control valve are in fluid communication with the gas flow channel within the interior of the gas manifold mounting block;
the controller is mounted onto the first mounting surface of the gas manifold mounting block and is electrically coupled to each gas flow control station;
the controller is programmed to provide a control signal to each control valve for controlling a position of each control valve such that a desired gas flow is produced;
the controller is further programmed to utilize a gas flow recipe program to automatically receive and process measured gas flow signals indicative of a flow rate of the gas flowing through each gas flow channel from each flow sensor and adjust a position of each control valve to regulate gas flow based on the measured gas flow signals in order to maintain a desired mass of gas flow for two or more gases to be released from the gas outlet;
the multi-inlet manifold comprises a multi-inlet mounting block, and two or more isolation valves mounted on the multi-inlet mounting block;
an interior of the multi-inlet mounting block comprises two or more multi-line inlets, two or more multi-line passageways, and two or more multi-line outlets;
the two or more multi-line passageways of the multi-inlet mounting block are fluidly coupled to the two or more multi-line inlets and the two or more multi-line outlets;
the two or more multi-line outlets of the multi-inlet mounting block are fluidly coupled to the two or more gas distribution flow paths of the gas manifold mounting block; and
each isolation valve is fluidly coupled to a corresponding multi-line passageway.

14. The device of claim 13, wherein:
the gas manifold mounting block further comprises a second mounting surface extending between the inlet end and the outlet end of the gas manifold mounting block; and
the first and second mounting surfaces extend along opposite sides of the gas manifold mounting block.

15. The device of claim 14, wherein at least one of the two or more gas flow control stations are mounted onto the second mounting surface of the gas manifold mounting block and is fluidly coupled to a corresponding gas flow channel of the gas distribution flow path via one or more gas flow apertures formed in the second mounting surface of the gas manifold mounting block.

16. The device of claim 14, wherein at least one of the two or more gas flow control stations is mounted onto the second mounting surface of the gas manifold mounting block and is coupled to the corresponding gas distribution flow path within the interior of the gas manifold mounting block via one or more gas flow apertures formed in the second mounting surface such that the flow sensor and control valve are in fluid communication with the gas flow channel within the interior of the gas manifold mounting block.

17. The device of claim 13, wherein:
the multi-inlet mounting block has an multi-line inlet end, an multi-line outlet end, and a top mounting surface extending between the multi-line inlet end and the multi-line outlet end;
each multi-line inlet of the interior of the multi-inlet mounting block is defined within the inlet end; and
each multi-line outlet of the interior of the multi-inlet mounting block is defined within the multi-line outlet end.

18. The device of claim 17, wherein each isolation valve is fluidly coupled to the corresponding multi-line passageway via one or more gas flow apertures formed in the top mounting surface.

19. The device of claim 13, wherein the multi-inlet manifold further comprises a purge port mounted on the multi-inlet mounting block.

20. The device of claim 17, wherein:
the multi-inlet mounting block further comprises a bottom mounting surface extending between the multi-line inlet end and the multi-line outlet end of the multi-inlet mounting block;
the top and bottom mounting surfaces extend along opposite sides of the multi-inlet mounting block; and
at least one of the two or more isolation valves are mounted onto the bottom mounting surface of the multi-inlet mounting block and is fluidly coupled to the corresponding multi-line passageway via one or more gas flow apertures formed in the bottom mounting surface.

* * * * *